(12) United States Patent
Emerson et al.

(10) Patent No.: US 8,584,189 B2
(45) Date of Patent: *Nov. 12, 2013

(54) SYSTEM AND METHOD FOR EMERGENCY COMMUNICATIONS THROUGH A SET-TOP BOX

(75) Inventors: David E. Emerson, Overland Park, KS (US); Gary W. Lafreniere, Olathe, KS (US); Michael S. Goergen, Bend, OR (US); David C. Lando, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 361 days.

This patent is subject to a terminal disclaimer.

(21) Appl. No.: 12/482,919

(22) Filed: Jun. 11, 2009

(65) Prior Publication Data

US 2010/0319021 A1   Dec. 16, 2010

(51) Int. Cl.
*H04N 7/173* (2011.01)
*H04M 11/04* (2006.01)

(52) U.S. Cl.
USPC .............. 725/108; 725/133; 725/33; 725/110; 725/131; 725/118; 379/45

(58) Field of Classification Search
USPC ......... 725/33, 78, 80, 81, 108, 110, 118, 131, 725/133, 139, 141, 151, 153; 340/539.26; 379/45; 455/404.1, 404.2
See application file for complete search history.

(56) References Cited

U.S. PATENT DOCUMENTS

| | | | |
|---|---|---|---|
| 6,868,292 B2* | 3/2005 | Ficco et al. | 700/19 |
| 7,110,829 B2* | 9/2006 | Cunningham et al. | 700/2 |
| 7,342,488 B2* | 3/2008 | Wolfe et al. | 340/500 |
| 7,536,704 B2* | 5/2009 | Pierre et al. | 725/58 |
| 7,764,943 B2* | 7/2010 | Radtke | 455/402 |
| 7,936,254 B2* | 5/2011 | McClenny et al. | 340/286.02 |
| 7,941,528 B2* | 5/2011 | Hicks et al. | 709/224 |
| 8,159,334 B2* | 4/2012 | McClenny et al. | 340/286.02 |
| 8,239,903 B1* | 8/2012 | Campagna et al. | 725/107 |
| 8,413,204 B2* | 4/2013 | White et al. | 725/133 |
| 2003/0028883 A1* | 2/2003 | Billmaier et al. | 725/46 |
| 2004/0114036 A1* | 6/2004 | Karaoguz et al. | 348/142 |
| 2005/0148316 A1* | 7/2005 | Laatu | 455/404.1 |
| 2006/0095950 A1* | 5/2006 | Coonce et al. | 725/108 |
| 2006/0294563 A1* | 12/2006 | Guillorit | 725/108 |
| 2007/0283384 A1* | 12/2007 | Haeuser et al. | 725/34 |
| 2008/0092199 A1* | 4/2008 | McCarthy et al. | 725/133 |
| 2008/0120639 A1* | 5/2008 | Walter et al. | 725/33 |
| 2008/0178251 A1* | 7/2008 | Shin | 725/141 |
| 2008/0235745 A1* | 9/2008 | Edwards et al. | 725/110 |
| 2009/0271831 A1* | 10/2009 | Binno et al. | 725/93 |
| 2010/0026817 A1* | 2/2010 | Ryan et al. | 348/207.11 |
| 2010/0251325 A1* | 9/2010 | Gupta | 725/133 |
| 2010/0333157 A1* | 12/2010 | Mickle et al. | 725/106 |
| 2013/0125177 A1* | 5/2013 | Pino et al. | 725/80 |

* cited by examiner

*Primary Examiner* — Pinkal R Chokshi
(74) *Attorney, Agent, or Firm* — Patton Boggs LLP

(57) ABSTRACT

A system and method for sending an emergency communication from a set-top box. A user and location of the user is associated with the set-top box. An indicator of an emergency is received through the set-top box. The user and the location associated with the set-top box are determined in response to receiving the indicator. A database returns the user and the location utilizing an identifier of the set-top box. An emergency communication is sent indicating the location through a media network in communication with the set-top box.

21 Claims, 5 Drawing Sheets

SYSTEM AND METHOD FOR EMERGENCY COMMUNICATIONS THROUGH A SET-TOP BOX

CROSS REFERENCE TO RELATED APPLICATIONS

This application incorporates by reference utility application Ser. No. 12/412,214, entitled SYSTEM AND METHOD FOR DIALING 911 FROM TV REMOTE filed on Mar. 26, 2009, and Ser. No. 12,482,937, entitled SYSTEM AND METHOD FOR EMERGENCY COMMUNICATIONS OF A LOCATION THROUGH A SET-TOP BOX filed on Jun. 11, 2009.

BACKGROUND

Communications technologies have grown nearly exponentially in recent years. The advancement and growth of the communications industry is fostered by enhanced services, smaller and more efficient devices, and well engineered standards and protocols. In some cases, legacy communications systems and devices have not kept pace with the rapid changes in the communications industry. For example, to save money many users have gone away from land lines and different types of wireless and data services. As a result, some users may find themselves in a position in which they are unable to efficiently communicate with emergency service providers or personnel without traveling from one location to another.

SUMMARY

One embodiment provides a system and method for sending an emergency communication from a set-top box. A user and location of the user may be associated with the set-top box. An indicator of an emergency may be received through the set-top box. The user and the location associated with the set-top box may be determined in response to receiving the indicator. A database may return the user and the location utilizing an identifier of the set-top box. An emergency communication may be sent indicating the location through a media network in communication with the set-top box.

Another embodiment provides an emergency communication system. The system may include one or more media networks operable to communicate an emergency communication. The system may also include a set-top box operable to communicate with the one or more media networks. The set-top box may be operable to communicate media content to a display for display to a user, receive an indicator of an emergency from a user, and generate the emergency communication and send the emergency communication through the one or more media networks. The system may also include a communications management system in communication with the set-top box through the media network. The communications management system may be operable to receive the emergency communication from the user, add user information and location information associated with the set-top box to the emergency communication, and send the emergency communication to an emergency service provider associated with a location of the user.

Yet another embodiment provides a set-top box for sending emergency communications. The set-top box may include a user interface operable to receive user input indicating an emergency. The set-top box may also include emergency logic in communication with the user interface. The emergency logic may be operable to determine user information and location information associated with the set-top box and generate an emergency communication indicating the location and the emergency. The set-top box may also include a transceiver in communication with the emergency logic. The transceiver may be operable to send the emergency communication to one or more media networks for routing to an emergency service provider serving a location of the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
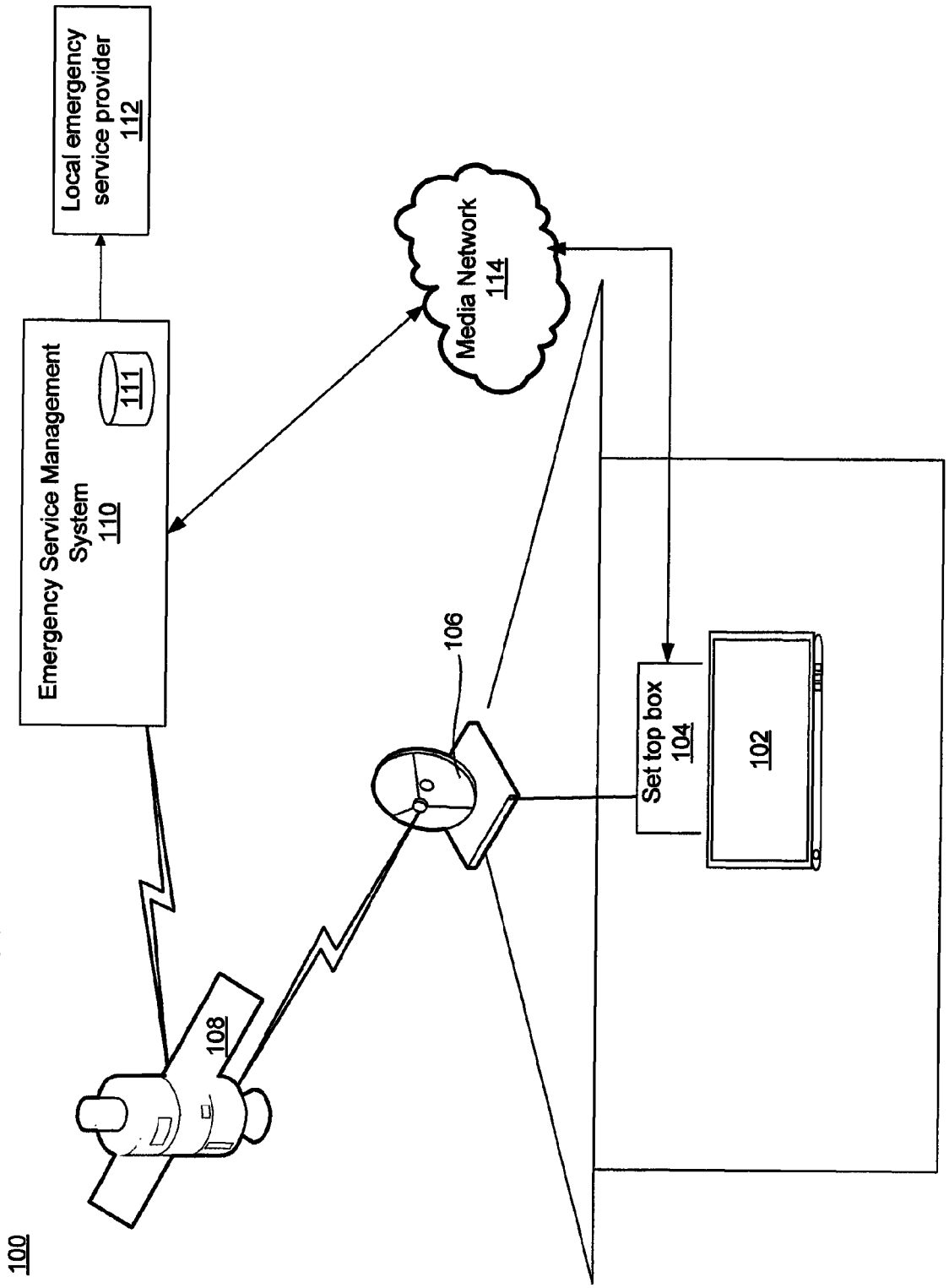
FIG. 1 is a pictorial representation of a satellite communications system in accordance with an illustrative environment.

The illustrative embodiments of the present invention provide a system and method for sending emergency communications from a set-top box. The emergency communications may include a discreet emergency message communicated to an emergency service provider through a media network. The media network is a communications network that may be utilized to communicate media content. The media network may include any number of networks and end-user connections including cable, DSL, fiber optics, satellite, Ethernet, ISDN, T1 and wireless networks as illustrative examples. In another embodiment, the emergency communication may be a real-time, two-way communication between the user and an emergency service provider in which the communications are routed from the set-top box through a media network to an emergency service provider. The emergency communication may be sent in one or more packets, parts, or components. For example, an emergency message may include multiple data transmissions that are reassembled to form the emergency message.

The set-top box is a conversion device operable to format media content for display by one or more televisions or other similar displays. In particular, the set-top box may be a device configured to decode a satellite, cable, fiber optic, Internet Protocol, or other signal, convert and format the signal for display by the television, and then communicate the reformatted signal to the television for display to the user. The set-top box may include a digital video recorder (DVR) or personal video recorder (PVR) operable to store media content for display as selected by the user.

The set-top box may be connected to or communicate with one or more elements of a media network. In one embodiment, the media network may include emergency logic and a database operable to determine the identity of a user and an address of the user from the emergency communication. The media network may add the information to the emergency communication before routing the message to a general or local emergency service provider. As a result, the user may be able to receive assistance by providing input through the set-top box. In another embodiment, emergency information may also include user specified information, such as the type of emergency being experienced and the reason for sending the emergency communication.

In another embodiment, user information stored by a communications service provider may be utilized to provide assistance to a user. The user information may include a fixed address of the user (or user residence), direction or access information to the user's dwelling, and other relevant details that may allow not only the service provider to find the dwelling, but emergency service personnel as well. For example, a user may have discontinued traditional voice and communications services including POTS, VoIP, Internet, and wireless service to save money. By entering a specific code or tuning to a specified channel, the user may be able to access an emergency menu that may allow a user to send an emergency communication that may be linked with the user information to send the appropriate emergency services or personnel. The set-top box may also retrieve and display self-help information for addressing the emergency situation.

FIG. 1 is a pictorial representation of a satellite communications system in accordance with an illustrative environment. FIG. 1 shows a simplified embodiment of a communications system 100. The communications system 100 may include any number of devices, systems and equipment. In one embodiment, the communications system 100 includes a television 102, a set-top box 104, a satellite transceiver 106, a satellite 108, an emergency service management system 110, customer database 111, a local emergency service provider 112, and a media network 114.

The television 102 is one embodiment of a display. A display is a device operable to communicate media content to a user. The display may utilize audible, visual, and tactile information to display the media content. In other embodiments, the television 102 may be a computer monitor, Braille pad, touch screen computing device, computer, or other device suitable for communicating media content as herein described. The media content may include television programs, movies, Internet content, pictures, data or other elements that may be communicated from the satellite 108 to the satellite transceiver 106 for formatting and converting by the set-top box 104 before being ultimately displayed by the television 102. The media content may alternatively be communicated from a service provider to the set-top box 104 through the media network 114. The media network 114 may include any number of intermediary devices to communicate with the set-top box and management systems, equipment and devices utilized by the service provider to operate one or more networks. For example, the media network 114 may include a number of media converters, servers, adapters, switches, splitters, routers, and other elements for communicating with the set-top box 104 through a fiber optic, cable, DSL, or other connection type.

The set-top box 104 may be an intelligent network device utilized by the user to display content received from a communications service provider. In one embodiment, the set-top box 104 may include decoding hardware, software, and logic that decode and format the signals for display to the television 102. For example, the set-top box 104 may include any number of keys, passwords or other authentication elements, schemes, or modules that confirm the user is authorized to receive and decode the satellite signal. The set-top box 104 may be owned, rented, or leased by the user.

The set-top box 104 may communicate with the television 102 utilizing any number of connectors, signals, protocols, or cables. In one embodiment, the set-top box 104 may communicate with the television 102 utilizing a high definition media interface (HDMI). In other embodiments, the television 102 and set-top box 104 may communicate utilizing RCA connectors, a cable interface, Bluetooth, Wi-Fi or other wired or wireless connections. In one embodiment, the set-top box 104 and the television 102 are devices that are networked together. In another embodiment, the set-top box 104 and the television 102 may be integrated as a single media device.

The satellite transceiver is the interface configured to send and receive signals to and from the satellite 108. In one embodiment, the satellite transceiver 106 may include a satellite dish configured to send and receive electronic signals and to manually or automatically locate the satellite 108. The satellite transceiver 106 may also include the hardware and software integrated with the set-top box 104 that may be configured to encode, decode, format or otherwise process signals sent and received by the set-top box 104.

The satellite 108 represents one or more satellite devices orbiting earth. In one embodiment, the satellite 108 may be in a geosynchronous orbit for directing and receiving signals by the satellite transceiver 106 and any number of other satellite transceivers and set-top boxes that users may employ. Any number of satellite orbits, transmissions protocols, and standards may be utilized to enable communication between the satellite transceiver 106 and the satellite 108.

The emergency service management system 110 is the devices, system, and equipment operable to send and receive signals to and from the satellite 108 and the media network 114. The emergency service management system 110 may include a communications management system utilized by one or more communications service providers or satellite service providers to manage communications with one or more satellites and one or more networks including the media network 114. The emergency service management system 110 may be integrated with or communicate with the communications management system.

The communications management system is one or more devices utilized to enable, initiate, route, and manage communications between one, or more communications devices including televisions, set-top boxes, telephones, central offices, switches, routers, computing devices, and other communications equipment. The communications management system may include one or more devices networked to manage the communications system 100. For example, the communications management system may include any number of servers, routers, switches, or advanced intelligent network devices.

The emergency service management system 110 may communicate with any number of wireless and wired communications networks represented by the media network 114. The communications networks may send and receive the electronic signals through any number of transmission mediums. The communications network may include various fiber optics, cables, transmission towers, antennas, or other elements for transmitting media, data, and voice communications to the communications devices of the communications system 100.

In one embodiment, the emergency service management system 110 may include the customer database 111. The customer database 111 is a database that stores information for a number of customers. The customer database 111 may store an address or location associated with the user, emergency contact information including phone numbers, email addresses, and usernames, physical directions to the user's residence or last known location and other similar details or information. The customer database 111 may access one or more other databases operated by the communications service provider, government, state, or other organization to route the emergency communication with the corresponding user information to the appropriate emergency service provider. In one embodiment, the customer database 111 may add user information to the emergency communication, such as local address, directions, and building or gate codes before further routing the emergency communication to the local emergency service provider 112. The customer database 111 may perform any number of look ups or queries to determine the associated user and location information. In another embodiment, the customer database 111 may be integrated in the set-top box 104.

The local emergency service provider 112 is one embodiment of a communications system, equipment, or devices utilized by an emergency service provider servicing an area, region or location that corresponds to the set-top box 104. For example, the local emergency service provider 112 may represent a dispatcher that receives emergency communications from a central location. In another embodiment, the local emergency service provider may represent a server configured to receive emergency messages and communicate those messages to emergency service rescue teams, firefighters, police officers, medical flight teams, paramedics, Coast Guard, ski patrols, government services or other groups, individuals, or organizations that respond to emergency communications and situations. The local emergency service provider 112 may be operated by one or more communications service providers, organizations, municipalities, governments, or other entities.

The emergency service management system 110 and local emergency service provider 112 may include an electronic or human operator configured to respond to the emergency communication. For example, the operator may request additional details from the user. In another embodiment, the operator may access user and location information and verbally or electronically communicate it to the local emergency service provider 112 emergency personnel, a neighbor, family member, or other potential responder. The operator may also control media including video and written instructions that may be sent to the set-top box 104 for display to the user.

The set-top box 104 and corresponding satellite transceiver 106 or satellite dish are operable to receive communications from the satellite 108. In another embodiment, the set-top box 104 may also communicate with any number of wireless base stations to communicate location information utilizing triangulation, multilateration, or other wireless determination methods.

The set-top box 104 may be configured to store a location of the set-top box 104 based on customer information entered by the user, a technician, or network administrators. In other embodiments, the set-top box 104 may determine the location at set intervals such as once a day, every 15 minutes, or three times daily.

In the event that an emergency is automatically or manually detected based on an indicator received through the set-top box 104, an emergency communication may be generated by the set-top box 104 and transmitted from the satellite transceiver 106 to the emergency management system 110 through the satellite 108 or media network 114. The satellite 108 may then relay the emergency communication to one or more ground based communications systems which may include the emergency service management system 110. The emergency service management system 110 may utilize a location database, emergency type or classification, or other information that may be included in the emergency communication to send the emergency communication to a central emergency services device, organization, or directly to the local emergency service provider 112. As a result, a local emergency service provider 112 may dispatch personnel, equipment or other resources to deal with the emergency reported from the set-top box 104. The additional figures may describe how an emergency is detected, determined or received by the set-top box 104 as well as the processes and steps that may be utilized and one or more user interfaces that may be utilized to receive information and display relevant information to the user.

In one embodiment, the user may be charged a monthly fee or usage fee for emergency communications. For example, in order to activate the set-top box 104 for emergency dialing the user may pay a $5 fee per month. In another example, each emergency call may cost the user $50.00. The fees may allow the service provider or operator of the media network 114 to recover costs associated with the communications system 100.

Figure 2:
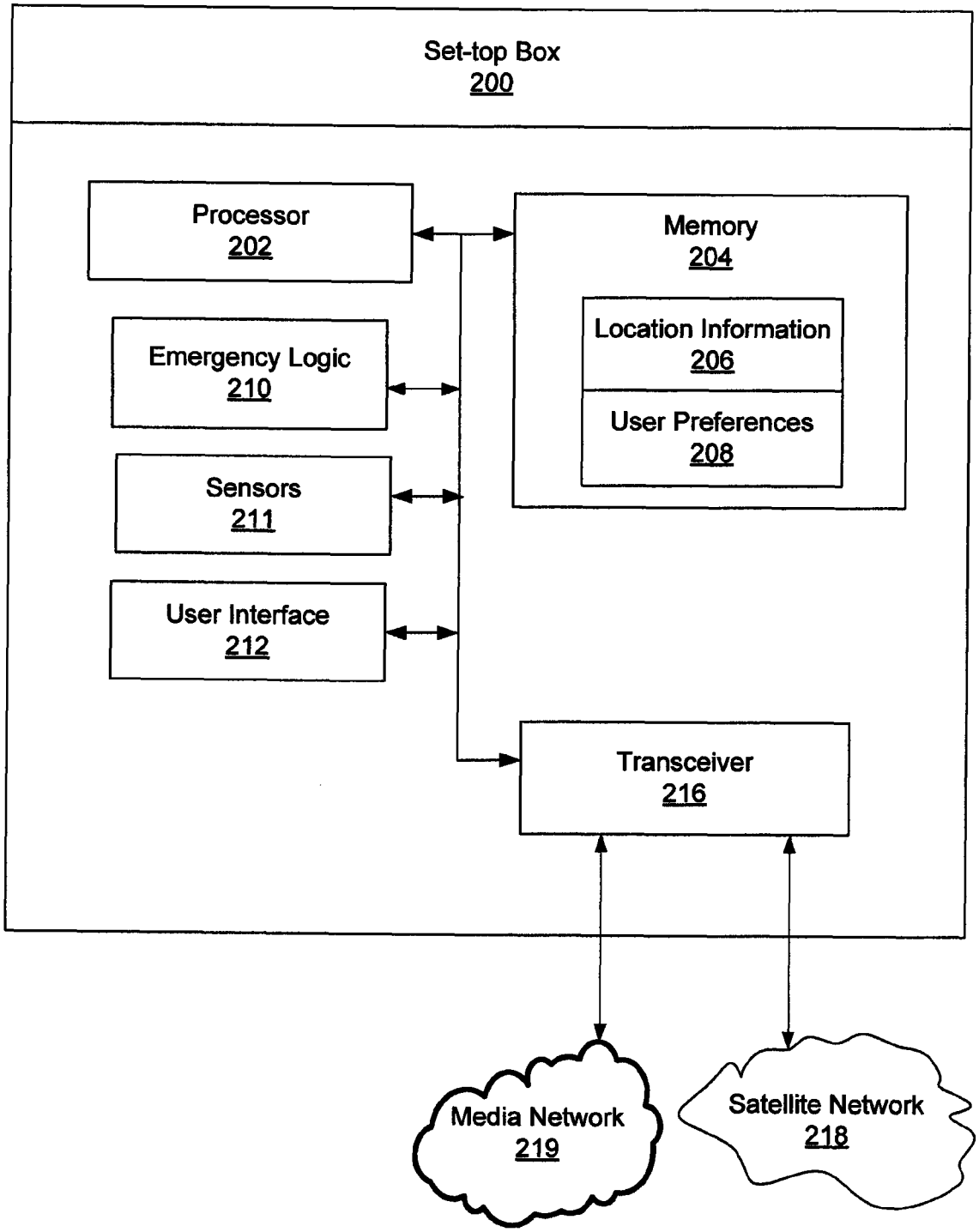
FIG. 2 is a block diagram of a set-top box in accordance with an illustrative embodiment.

FIG. 2 is a block diagram of a set-top box in accordance with an illustrative embodiment. The set-top box 200 of FIG. 2 is a particular implementation of the set-top box 104 of FIG. 1. The set-top box 200 may include a processor 202, a memory 204, location information 206, user preferences 208, emergency logic 210, sensors 211, a user interface 212, and a transceiver 216. The set-top box 200 may further communicate with a satellite network 218, and a media network 219.

The processor 202 is circuitry or logic enabled to control execution of a set of instructions. The processor 202 may be microprocessors, digital signal processors, application-specific integrated circuits (ASIC), central processing units (CPUs), or other devices suitable for controlling an electronic device, including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums. The set-top box 200 may include any number of computing and telecommunications components, devices or elements which may include busses, motherboards, circuits, ports, interfaces, cards, converters, adapters, connections, transceivers, displays, antennas, and other similar components.

In one embodiment, the steps and determinations performed by the set-top box 200 may be implemented by executing modules or instructions stored in the memory 204. For example, all of the components of the set-top box 200 may be stored as modules in the memory 204 for execution by the processor 202. In another embodiment, the various elements of the set-top box 200 may be logic and hardware that may implement the methods, processes, and features as described herein. The location information 206 is information, data or other details that describe the location of the set-top box 200. As previously described, the set-top box 200 may store location information input at the time of installation, entered by the user, or otherwise retrieved by the set-top box 200. In another embodiment, the location information 206 may be configured to store the most recent location of the set-top box 200 as automatically or manually determined based on automatic or manual user entries. For example, a request to the service provider for a new billing address may list the new address as a new potential address as well as one or more previous addresses. In one embodiment, the location information 206 may store information entered or received by a user or device within the satellite network 218 or media network 219. In another embodiment, the location information 206 may be synchronized between the location information 206 and a database in the satellite network 218 or the media network 219.

The user preferences 208 are the preferences, parameters, and conditions that may govern automatic or manual steps taken by the set-top box 200. In one embodiment, the user preferences 208 may control how an emergency menu is displayed to the user. For example, the user preferences 208 may require that a user verify that there is indeed an emergency before sending the emergency communications to prevent inadvertently sending an emergency communication. The user preferences 208 may also control how one or more menus that provide information regarding emergencies may be displayed to the user. Any number of different preferences, passwords, schemes, connection information or other details may be stored in the user preferences 208.

The transceiver 216 is operable to send and receive communications between the satellite network 218 and the media network 219. The transceiver 216 may also transmit the emergency communication through the satellite network 218 and media network 219 once generated by the emergency logic 210 and other components of the set-top box 200.

The emergency logic 210 is the logic operable to determine whether there is an emergency and generate the emergency communication in response to determining there is an emergency. In one embodiment, the emergency logic 210 generates a message similar to an e-mail or a text message that is communicated via a satellite or media transmission. The emergency communication may include the location stored in the location information 206 and communicated through the transceiver 216. The emergency communication may also include other details, data, and information from the location information 206. In one embodiment, the emergency logic 210 may determine there is an emergency based on a user selection of a specified button or button combination on the set-top box 200 or utilizing a remote control in communication with the set-top box 200. For example, by entering the channel or code 911 the emergency logic 210 may command the user interface 212 to display an emergency message that asks the user if there is an emergency. Then, in response to one or more affirmative responses the emergency logic 210 may generate the emergency communication.

The sensors 211 are measurement devices integrated with or external to the set-top box 200. The sensors 211 may be configured to detect certain environmental or ambient conditions. In one embodiment, the sensors 211 may include smoke sensors, carbon monoxide sensors, toxic gas sensors, water sensors, wind sensors, accelerometers and other similar measurement or detection devices suitable for determining the condition of the set-top box 200. In one embodiment, the sensors 211 may send a signal or a command to the emergency logic 210 that may utilize the sensory information to generate the emergency message automatically for communication to the satellite network 218. For example, in response to the sensors 211 detecting unacceptable levels of smoke and an elevated temperature of 180 degrees, the emergency logic 210 may generate an emergency communication including the name or hardware identifier associated with the user of the set-top box 200 and the associated address, access information, and driving instructions.

The user interface 212 is the interactive audio, visual, and tactile elements for receiving user input and communicating information to/from the user. In one embodiment, the user interface 212 displays a special screen and menu to the user based on selection of a specific channel. For example, channel 911 may be linked with emergency services. If the user selects channel 911, the user interface 212 may display a graphical user interface (GUI) that displays and receives information from a user through a remote control, voice command, button selections or other communications.

In another embodiment, the user interface 212 may automatically send an indicator to the emergency logic 210 so that an emergency communication may be generated within the set-top box 200 for communication to an external network. In another embodiment, an emergency indicator may be sent to the satellite network 218 or the media network 219 that then generate the emergency communication with the corresponding name, address, directions, and other instructions for reaching the user.

In another embodiment, the user interface 212 may display menus that may be utilized to address emergency situations. For example, the user interface 212 may provide a menu addressing steps to take in the event of a snakebite as well as presenting pictures and images in order to properly diagnose the type of snake that has bitten a user. In one embodiment, the user logic 210 may prompt a user to enter information indicating the circumstances surrounding the emergency. For example, the emergency information may indicate that a user has been attacked by an animal, suffered an injury, is extremely ill, is having an allergic reaction, is experiencing a flood, or other emergency circumstances that may require help or assistance. The user interface 212 may provide information details, steps, or other information that may be utilized by the user or other individuals in proximity to the set-top box 200 to address the emergency situation or conditions. In another embodiment, an instructional video, written instructions, or real-time audio or video may be streamed to the user through the set-top box 200 to address the emergency.

Figure 3:
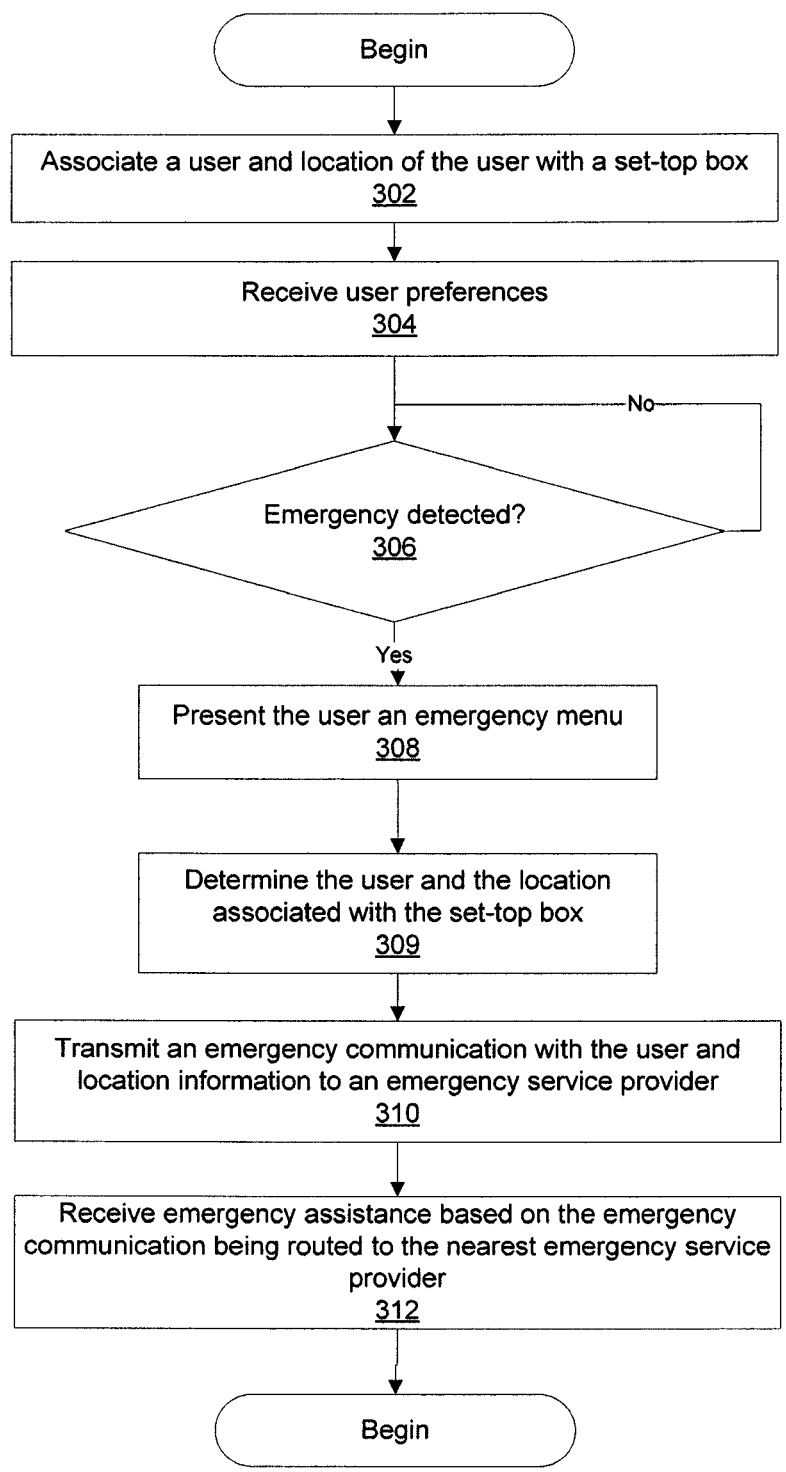
FIG. 3 is a flowchart of a process for emergency communications through a set-top box in accordance with an illustrative embodiment.

FIG. 3 is a flowchart of a process for emergency communications through a set-top box in accordance with an illustrative embodiment. In one embodiment, the process of FIG. 3 may be implemented by a user utilizing a set-top box. The set-top box may communicate with one or more displays to display information and receive user input. For example, the set-top box may communicate with a high definition organic light emitting diode (OLED) television and receive user input through a next generation Bluetooth remote control. In another embodiment, the set-top box may communicate with one or more communications management systems, emergency systems, and databases to perform all or portions of FIG. 3.

The process of FIG. 3 may begin by associating a user and location of the user with a set-top box (step 302). In one embodiment, the information of step 302 may be entered by a communications service provider network operator or technician during a request for service, service activation, or during the installation process. The location may correspond to a physical address provided by the user or service provider. The location may also be determined utilizing wireless determination which may include GPS, triangulation, multilateration, trilateration, and other similar location determination methods. For example, a service technician may utilize a mobile computing system to link a GPS determined latitude and longitude with the set-top box and/or user. The general location information may be received by prompting a user to enter applicable details regarding the location. For example, the user may enter an address to an apartment and a guest access password for entering the apartment complex. In various embodiments, the user information and location information may be stored in a memory of the set-top box and/or in a database operated by the communications service provider. The set-top box may be identified utilizing an assigned hardware or software code, including a MAC address, IP address, email address, registration code, or other identifier.

Next, the set-top box receives user preferences (step 304). The user preferences of step 304 may provide information for generating an emergency communication. For example, the user preferences may set threshold levels for one or more sensors in the set-top box indicating when an emergency communication is generated and information to include in the emergency message, such as a percentage of carbon monoxide content in a structure. The user preferences may also associate one or more channels with an emergency menu. As a result, by receiving user input tuned to that channel, the emergency menu and options may be automatically presented to the user. Similarly, the user may require that multiple confirmations be given to ensure that a child or other user does not accidentally initiate an emergency communication.

Next, the set-top box determines whether an emergency is detected (step 306). In one embodiment, the emergency is detected based on a proactive user selection indicating an emergency status condition or need. For example, the user may select a dedicated button on the remote control or set-top box, tune to a particular channel, or enter an emergency code. In another embodiment, the emergency may be detected based on one or more sensors in the set-top box. For example, the set-top box may be mounted or installed within a cabinet or entertainment center of a home. In response to determining the set-top box is at a temperature of 160 degrees and sensing smoke, an emergency communication may be initiated. If an emergency is not detected, step 306 is repeated or alternatively step 302 may be repeated.

Next, the set-top box presents the user with an emergency menu (step 308). In one embodiment, the emergency menu may provide a user information to address the emergency situation, conditions, or environment. For example, the emergency menu may provide a user information of how to properly administer CPR for a person that may be drowning. The emergency menu may alternatively confirm that there is indeed an emergency so that an emergency communication is not sent unnecessarily.

Next, the set-top box determines the user and the location associated with the set-top box (step 309). In one embodiment, an IP address, MAC address, or other hardware or software identifier associated with the set-top box may be utilized to determine user information and location information. For example, the correlation of step 309 may be performed utilizing one or more databases. In one embodiment, step 309 may be performed by a database that receives an emergency message or indicator from the set-top box and then adds or integrates the associated user and location information before further routing or communicating the emergency message.

Next, the set-top box transmits an emergency communication with the user and location information to an emergency service provider (step 310). During step 310, the set-top box generates the emergency communication and adds user and location information to the emergency communication. For example, the user and location information may include fields that are packetized and communicated. The emergency communication may also include other details or emergency information that may have been received from the user based on input or feedback from the emergency menu or based on the original reporting of an emergency. In one embodiment, the set-top box may also have a wireless transceiver or other emergency signaling beacon that may transmit a signal that may be received by other commercial or organizational systems or users. For example, a cell signal may be sent to cell towers or receivers within range with a text-to-voice application converting the location information and user information into words and details that may be utilized by emergency personnel to address the issue. In another embodiment, the location and user information may be integrated, added, or appended to an original message sent by the set-top box by the communications service provider before routing the emergency communication.

Next, the set-top box receives emergency assistance based on the emergency communication being routed to the nearest emergency service provider (step 312). Step 312 is not indicative of a step performed by the set-top box but rather indicates the fruition of the emergency communication process as described in FIG. 3 to rescue or provide assistance to the user.

Figure 4:
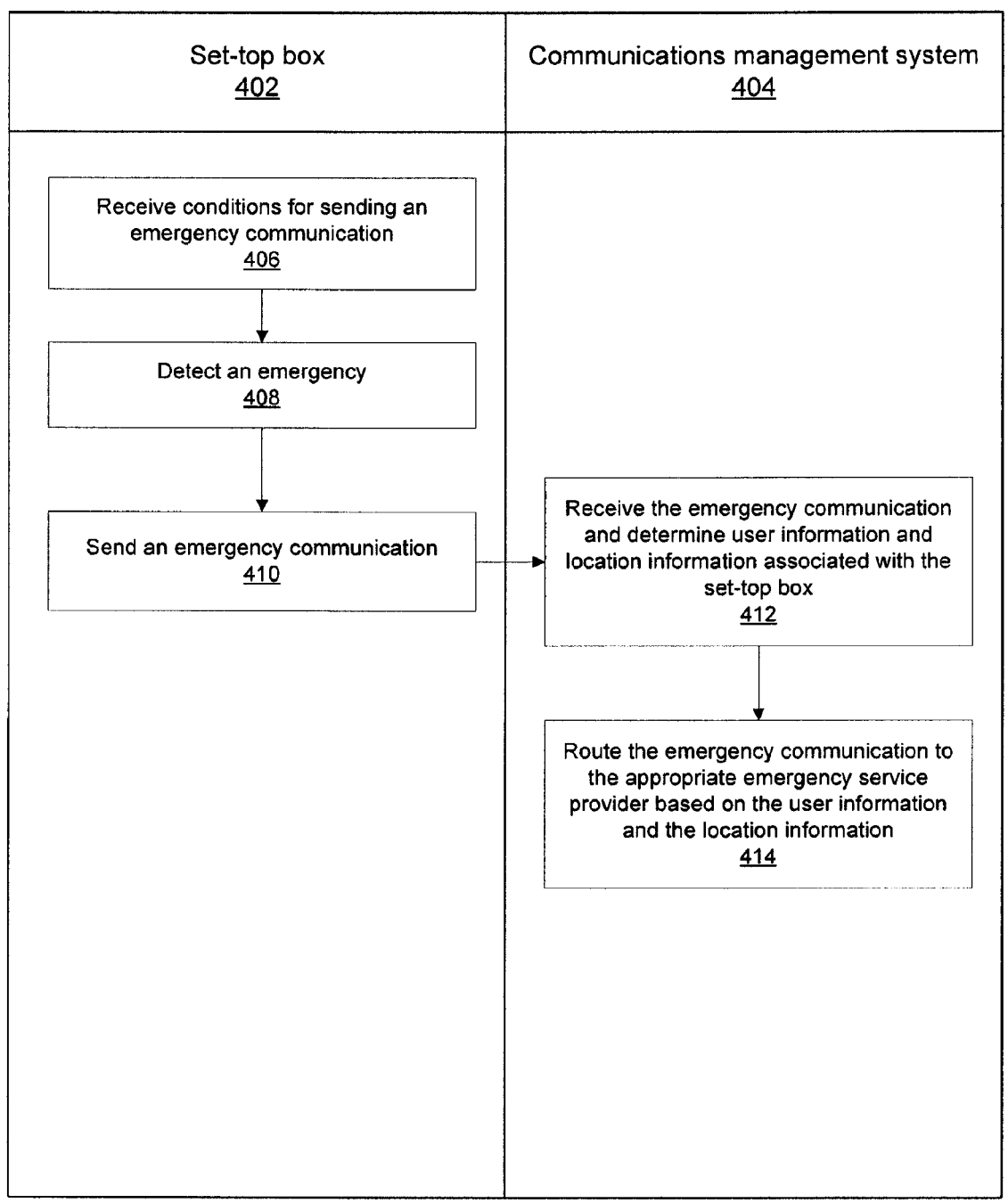
FIG. 4 is a flowchart of a process for sending emergency communications in accordance with an illustrative embodiment.

FIG. 4 is a flowchart of a process for sending emergency communications in accordance with an illustrative embodiment. The process of FIG. 4 may be implemented by a set-top box 402 and a communications management system 404. The process may begin by receiving conditions for sending an emergency communication (step 406). The conditions may be parameters, measurements, or conditions detected by sensors embedded within the set-top box 402. For example, in response to detecting a large amount of water internal to the set-top box 402 or from an external sensor communicating with the set-top box 402, the set-top box 402 may determine the time is appropriate to send an emergency communication with or without confirmation from a user. In one embodiment, the circuitry, logic and other elements of the set-top box 402 utilized to send and receive emergency communications may be shielded to prevent the intrusion and damage caused by water, smoke, earthquake, or other event that may potentially damage the set-top box 402. In another embodiment, the conditions may establish how user input is received and verified to initiate an emergency communication. For example, a dedicated channel, code word, or other information may be utilized as well as a follow-up confirmation screen or entry.

Next, the set-top box 400 detects an emergency (step 408). As previously described, the emergency may be detected based on a user selection. The parameters for the user selection may be simple or complex based on the requirements of the user which may allow any number of users including children and persons with disabilities to perform emergency calling. In another embodiment, sensors within the set-top box 402 or sensors externally linked to the set-top box 402 through a power line network, Ethernet, Bluetooth, wireless connections, or other internal links, networks or connections may indicate that an emergency is or has occurred.

Next, the set-top box 402 sends an emergency communication (step 410). In one embodiment, the emergency communication may be a discreet message sent in a discreet format. For example, a set-top box identifier and emergency information received from the user may be generated by the set-top box 402 and communicated. The information from the user may include a user entered address, physical location, emergency condition, or other information entered at the time of the emergency or beforehand. For example, a text display accessible through a remote control may allow a user to enter information. In another embodiment, the set-top box 402 and corresponding microphones and speakers may initiate real-time communications, such as a chat session or voice communication that may allow a user to further specify the nature and facts of the emergency.

Next, the communications management system 404 receives the emergency communication and determines user information and location information associated with the set-top box 402 (step 412). The user information may include details saved within the set-top box 400 that identified the user. Alternatively, the user information may be saved and accessed as part of a satellite or media communications network managed by the communications management system 404. For example, a set-top box identifier or username may be utilized to retrieve the location information or other user information that may be stored in a database and associated with the identifier. The location information may include details that were used by the service provider to arrive at the residence, business, or other location of service during installation or maintenance efforts and which also may be useful to emergency service personnel.

As previously described, the emergency information may include information specifying information about the emergency as self-reported by the user or as determined by the set-top box 402. The user information may include a fixed location, dwelling, residence, building, or position of the user and corresponding set-top box 402. As a result, the user information may be stored locally in the set-top box 402 or in one or more network systems, devices, or equipment operated by the communications service provider or emergency service provider. The user information may be added to the emergency communication before being sent or after being received by the communications service provider. In another embodiment, the emergency communication of step 410 may include only basic information or indicators that an emergency has been detected and the actual emergency communication and corresponding information may be generated or added to the emergency communication by the communications management system 404.

Next, the communications management system 404 routes the emergency communication to the appropriate emergency service provider based on the user information and the location information (step 414). The communications management system 404 may utilize any number of emergency service networks, centralized systems, numbers, IP addresses, or other delivery information to ensure the emergency communication is sent to an emergency service provider that covers the area or location of the user as well as a type of emergency, if known. In another embodiment, the communications management system 404 may route the emergency communication to a centralized distribution system for emergency communications.

The set-top box 402 and communications management system 404 may communicate to display a self-help menu and content during or after reporting the emergency. The self-help menu may provide a medical or emergency dictionary like content that may allow a user to utilize symptoms, circumstances and conditions to determine possible actions that the user may take to address the emergency. For example, in the event that an individual with the user has been struck by lightning the self-help menu may provide instructions and visual representations of how to administer CPR as well as how to best prepare the individual to survive the lightening strike while emergency service providers are summoned to the location. In another example, the set-top box may include a partition with informational video clips and audio clips that may be utilized by the user. In another embodiment, by activating the emergency feature of the set-top box 402 an operator may be able to stream live video or other details providing assistance to the user.

Figure 5:
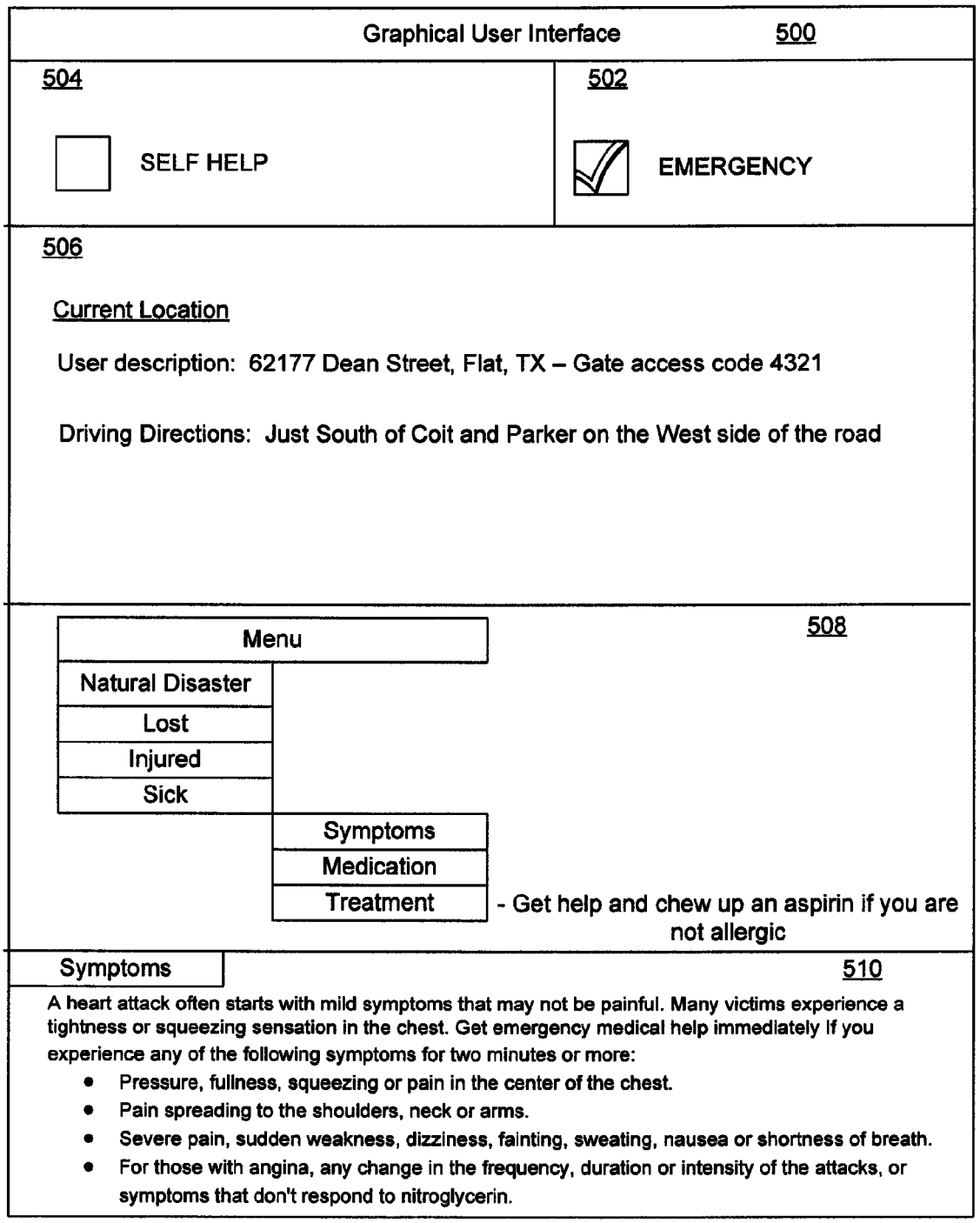
FIG. 5 is a pictorial representation of a graphical user interface in accordance with an illustrative embodiment.

FIG. 5 is a pictorial representation of a graphical user interface (GUI) in accordance with an illustrative embodiment. FIG. 5 illustrates one example of a GUI 500. The GUI 500 may include any number of selection elements, indicators, buttons, icons, fields, checks and graphical representations, menus, scrollbars, nested menus and other similar interactive elements. In one embodiment, the GUI 500 may include sections 502, 504, 506, 508 and 510.

In one embodiment, the GUI 500 may be linked with a specific channel. For example, channel 100 may be linked with emergency communications between the set-top box and a media network or satellite network. In one embodiment, the GUI 500 may allow a user to specify an emergency channel, such as channel 100, as well as codes, identifiers, and confirmation information that may be required in order to send an emergency communication. The confirmation information may ensure that an emergency communication is not inadvertently sent that may waste valuable emergency resources and readiness.

In one example, the GUI 500 may allow a user to select between an emergency or a self-help interface as shown in sections 502 and 504, respectively. Section 502 may be activated in order to immediately proceed with an emergency communication. Section 504 may be utilized before or after selecting to send an emergency communication. For example, the user may select to receive self-help in response to children with the user being affected by poison oak.

Section 506 may display location information. In one embodiment, section 506 may display a location as entered by a user or stored in a system of the communications service provider. Section 506 may also include a user description, driving directions or access information for further providing information or details to emergency services or other individuals that may be participating in assisting the user. For example, unmarked roads may be physically described as well as a warning to avoid the neighbors dogs.

Section 508 may provide a nested menu that may allow a user to address the emergency situation. For example, the menu may include options for a natural disaster, being lost, injured, sick, in an accident or other situation that the user may encounter. In one embodiment, section 508 may provide a user symptoms, medication and treatment for a heart attack. For example, section 508 may provide guidance to chew up an aspirin if the user is not allergic and similarly section 510 may provide detailed symptoms that may allow the user to determine whether a heart attack is being experienced by the user or someone with the user.

Although particular embodiments of the present invention have been explained in detail, it should be understood that various changes, substitutions, and alterations can be made to such embodiments without departing from the scope of the present invention as defined by the following claims.

What is claimed is:

1. A method for sending an emergency communication from a set-top box, the method comprising:
   associating a user and a location of the user with the set-top box;
   receiving an indicator of an emergency utilizing the set-top box, wherein the indicator is enabled to be generated utilizing (1) sensors integrated with the set-top box, and (2) user input received through a menu presented to the user by the set-top box, wherein the menu presents the user options to select between an emergency interface and a self-help menu, wherein the emergency interface is configured to receive the indicator, and wherein the self-help menu provides a nested menu to allow the user to indicate a nature of emergency and displays associated content to assist the user in dealing with the emergency;

determining the user and the location associated with the set-top box in response to receiving the indicator;

generating an emergency communication as a discrete message utilizing the set-top box in response to receiving the indicator, wherein the emergency communication indicates the user and the location associated with the set-top box if determinable; and sending the emergency communication from the set-top box as the discrete message, wherein the emergency communication is sent as the discrete message through a media network in communication with the set-top box in response to receiving the indicator.

2. The method of claim 1, further comprising:
routing the emergency communication to an emergency service provider associated with the location.

3. The method of claim 1, wherein the associating is performed during installation or maintenance of a service associated with the set-top box.

4. The method of claim 1, wherein a database of a communications management system adds the user and the location utilizing an identifier of the set-top box in response to being unable to determine the user and the location associated with the set-top box.

5. The method of claim 1, wherein the associating, receiving, determining, generating and sending are performed by the set-top box.

6. The method of claim 1, wherein the associating, receiving, determining, generating and sending are performed by a communications management system managing the media network.

7. The method of claim 1, wherein the indicator is received through a graphical user interface displayed to the user by the set-top box.

8. The method of claim 1, wherein the indicator is a user selection of a channel associated with emergency communications and confirmation indicating the emergency.

9. The method of claim 1, wherein the associating is performed utilizing an identifier of the set-top box.

10. The method according to claim 7, wherein the set-top box sends the emergency communication through a satellite transceiver in communication with the set-top box.

11. The method according to claim 1, further comprising:
receiving input from the user providing information about the emergency; and
displaying a menu with information for addressing the emergency in response to the input.

12. The method of claim 1, wherein the sensors detect a fire, sudden acceleration, excessive water, or toxic gas.

13. The method according to claim 6, further comprising:
generating an emergency message at the communication managements system, the emergency message being routed to an emergency service provider in response to receiving the emergency communication and performing the associating.

14. A emergency communication system, the system comprising:
one or more media networks operable to communicate an emergency communication;
a set-top box operable to communicate with the one or more media networks, the set-top box being operable to communicate media content to a display for display to a user, receive an indicator of an emergency, generate the emergency communication as a discrete message, and send the emergency communication as the discrete message from the set-top box through the one or more media networks, wherein the indicator is enabled to be generated by the set-top box utilizing (1) sensors integrated with the set-top box, and (2) user input received through a menu presented to the user by the set-top box, wherein the menu presents the user options to select between an emergency interface and a self-help menu, wherein the emergency interface is configured to receive the indicator, and wherein the self-help menu provides a nested menu to allow the user to indicate a nature of emergency and displays associated content to assist the user in dealing with the emergency; and
a communications management system in communication with the set-top box through the media network, the communications management system being operable to receive the emergency communication from the user, add user information and location information associated with the set-top box to the emergency communication, and send the emergency communication as the discrete message to an emergency service provider associated with a location of the user determined from the location information.

15. The system of claim 14, wherein the communications management system adds the user information and location information utilizing an identifier of the set-top box in response to determining the user information and location information is not included in the emergency communication when received.

16. The system of claim 15, wherein the communications management system includes a database for associating the identifier with the user information and the location information.

17. The system of claim 14, wherein the indicator is received by the set-top box in response to the user tuning the set-top box to a channel associated with emergency communications and confirming the emergency.

18. A set-top box for sending emergency communications comprising:
a user interface operable to receive user input indicating an emergency;
sensors integrated with the set-top box operable to detect the emergency;
emergency logic in communication with the user interface, wherein the emergency logic is operable to determine user information and location information associated with the set-top box and generate an emergency communication as a discrete message indicating the user information, the location information, and the emergency, and wherein the user interface provides the user options to select between an emergency interface and a menu, wherein the emergency interface is configured to receive an indicator of the emergency, and wherein the menu including a self-help menu that allows the user to indicate a nature of emergency and displays associated content to assist the user in dealing with the emergency; and
a transceiver in communication with the emergency logic, the transceiver being operable to send the emergency communication from the set-top box as the discrete message to one or more media networks for routing to an emergency service provider serving a location of the user.

19. The set-top box according to claim 18, further comprising:
a database in communication with the user interface, wherein the self-help menu is operable to display information for addressing the emergency including one or more nested self-help menus, and wherein the discrete message is at least one of an email message or a text message.

20. The set-top box according to claim 18, wherein the sensors are operable to detect a fire, excessive water, or toxic gas.

21. The set-top box according to claim 18, wherein a communications management system in communication with the set-top box through the one or more media networks is operable to verify the user information and the location information, wherein the location information indicates driving directions and instructions for accessing a location of service of the set-top box.

* * * * *